United States Patent [19]

Deutsch

[11] Patent Number: 5,053,110
[45] Date of Patent: Oct. 1, 1991

[54] SOLAR WATER DISTILLATION SYSTEM

[76] Inventor: David Deutsch, 1013 E. Bellevue Rd., Atwater, Calif. 95301-2329

[21] Appl. No.: 596,317

[22] Filed: Oct. 12, 1990

[51] Int. Cl.$^5$ .......................... B01D 3/02; C02F 1/14
[52] U.S. Cl. .................... 202/176; 202/177; 202/181; 202/206; 202/234; 202/266; 202/267.1; 159/903; 203/2; 203/10; 203/47; 203/86; 203/98; 203/DIG. 1; 203/DIG. 20; 203/DIG. 22; 203/DIG. 25
[58] Field of Search ............ 202/234, 176, 178, 177, 202/188, 267.1, 266, 190, 202, 206; 203/10, DIg. 1, DIG. 22, DIG. 20, 86, 2, 98, DIG. 17, DIG. 25, DIG. 18, 47; 159/903

[56] References Cited

U.S. PATENT DOCUMENTS

| | | | |
|---|---|---|---|
| 2,490,659 | 12/1949 | Snyder | 159/903 |
| 2,636,129 | 4/1953 | Agnew | 203/DIG. 20 |
| 3,351,536 | 11/1967 | Fox | 202/188 |
| 3,390,056 | 6/1968 | Ingram | 202/83 |
| 3,529,662 | 9/1970 | Roe | 203/10 |
| 3,775,257 | 11/1973 | Lovrich | 203/DIG. 1 |
| 4,075,063 | 2/1978 | Tsay et al. | 202/234 |
| 4,134,393 | 1/1979 | Stark et al. | 203/DIG. 1 |
| 4,135,985 | 1/1979 | La Rocca | 159/903 |
| 4,154,657 | 5/1979 | Dennen | 159/28.4 |
| 4,211,609 | 7/1980 | Diggs | 159/903 |
| 4,219,387 | 8/1980 | Gruntman | 203/DIG. 1 |
| 4,487,659 | 12/1984 | Stark | 203/DIG. 1 |
| 4,882,012 | 11/1989 | Wasserman | 202/176 |
| 4,938,868 | 7/1990 | Nelson | 203/DIG. 20 |

FOREIGN PATENT DOCUMENTS

| | | | |
|---|---|---|---|
| 3015254 | 10/1981 | Fed. Rep. of Germany | 203/DIG. 1 |
| 3536149 | 4/1987 | Fed. Rep. of Germany | 203/DIG. 1 |
| 31575 | 3/1978 | Japan | 203/DIG. 1 |
| 735875 | 5/1980 | U.S.S.R. | 203/DIG. 1 |
| 812804 | 4/1959 | United Kingdom | 203/DIG. 1 |
| 166840 | 10/1969 | United Kingdom | 203/DIG. 1 |

Primary Examiner—Wilbur Bascomb, Jr.
Attorney, Agent, or Firm—Cornelius J. Husar

[57] ABSTRACT

The disclosure relates to a solar-operated apparatus to purify and/or desalinate water. Several embodiments are disclosed, each of which substantially derives its source of heat from solar energy. The apparatus includes a unique design of the evaporating collector dome which is provided with a smooth interior surface to permit collection of increased amounts of distillate. The apparatus exterior is provided with a black surface to serve as a black body and so absorb increased amounts of the sun's energy. Additionally, that same exterior is coated with a film of infra-red absorbing material (STET) to further increase solar-energy absorption. To further improve the system's efficiency, various external tubing designs are utilized to preheat the load prior to its entry into the evaporating chamber. The distillate-collecting vessel is a downwardly-extending dome. This increases the volume while at the same time reducing re-evaporation by minimizing the exposed surface area. Additionally, locating the apparatus on the side of a hill or other elevated topography, permits a further increase in overall system-efficiency by using gravity to force the distillate through a turbine/generator for co-generation of electricity. The co-generation of electricity which further increases the overall system efficiency.

21 Claims, 5 Drawing Sheets

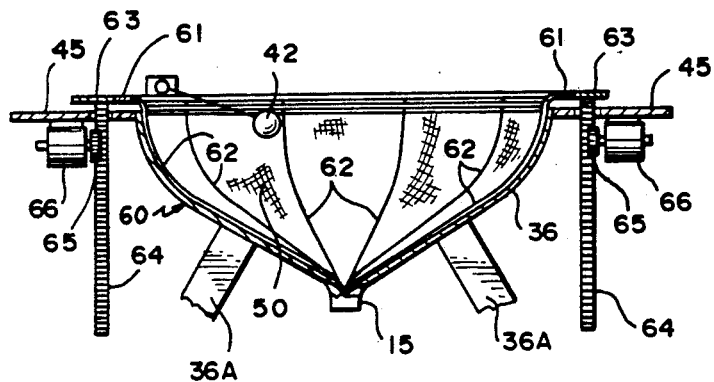
FIG. 6
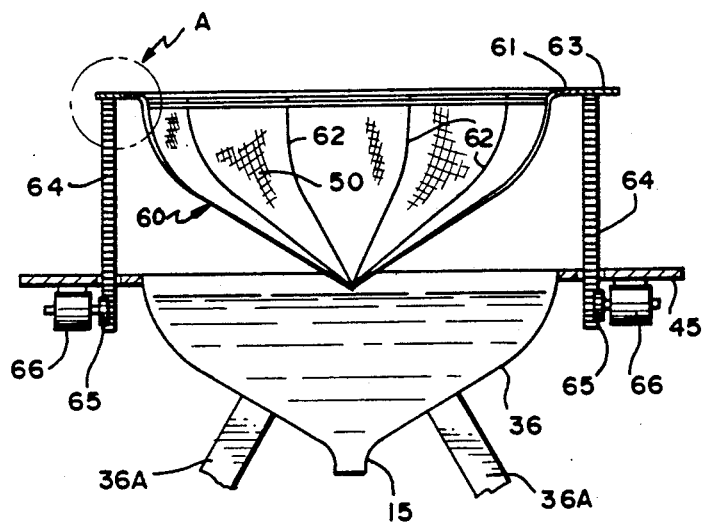
FIG. 7
FIG. 8
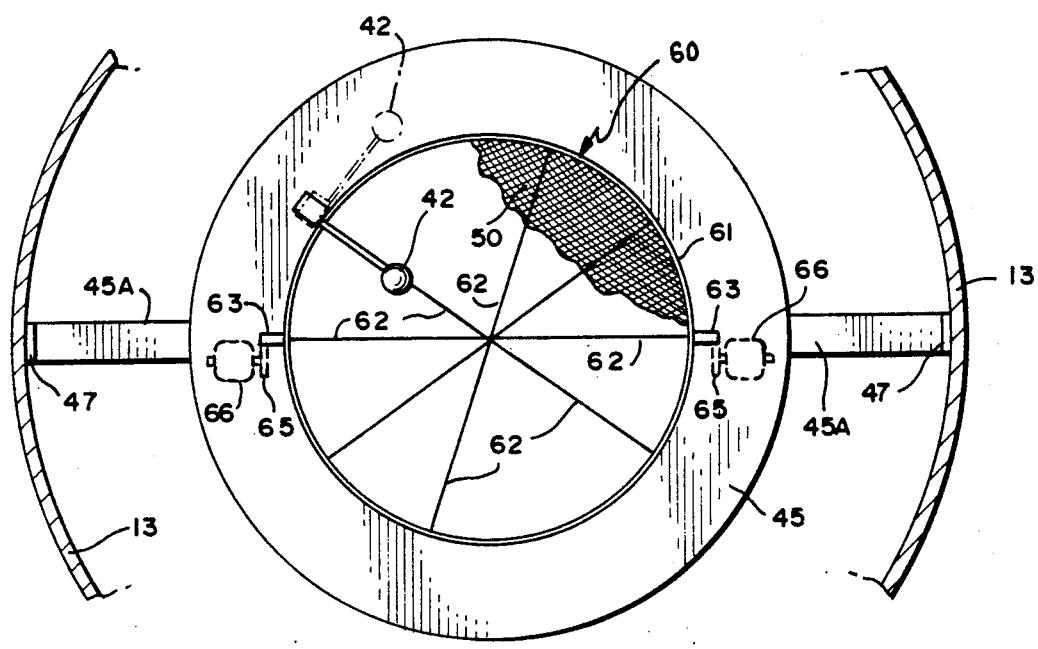

SOLAR WATER DISTILLATION SYSTEM

BACKGROUND OF THE INVENTION

Global warming and population growth are increasingly creating water shortages that place great strains on our natural water sources. As we are all aware, many areas within the United States are already experiencing grave water shortages. The Western states and, more specifically, California have numerous locales wherein the current water situation has reached critical stages.

In Southern California a large desalinization plant has been built by one of the local communities to run sea water through evaporators in the conventional manner so as to distill it and produce pure drinkable (potable) water. As one can expect, the evaporating process is slow, plants are expensive to build and also very expensive to keep in operation. Maintenance of such a plant requires constant monitoring of the evaporators to insure that deposits on the evaporator coils do not exceed tolerable limits. When the deposits build-up excessively, they act as an insulator and reduce the rate of heat transfer to the interior of the evaporators. Thus, from time to time, the evaporators have to be shut down and opened up to remove the coils for cleaning of the deposit build-up. This overall cleaning operation is extremely labor-intensive and requires many man-hours of work before the particular evaporator can be returned to service.

Additionally, the most common energy source for powering the above evaporators is oil, usually of a grade comparable to home heating oil. As is well known, our supplies of such energy sources are rather limited and to a large extent, their availability depends on the whims of certain Mideastern countries.

In addition to the above-noted severe water shortage, this country is also experiencing critical difficulties in the disposition of sewage, industrial or agricultural sludge and all other forms of polluted water. The present state of environmental concern demands that individuals and corporations no longer dump their waste by-products in the community sewage system or into the nearest river or tributary thereof. Further, the very impurities polluting the waste water could, if recycled, prove to be a lucrative source of valuable raw materials.

SUMMARY OF THE INVENTION

With the aforementioned information in mind, Applicant was motivated to direct his ambitions toward solutions of the above noted problems. Applicant has developed a system for desalinization of sea water and also the purification of various forms of waste water through the use of solar energy. Although there have been earlier attempts to design such a system the overall efficiency and costs were not sufficient to warrant widespread use.

Applicant's system utilizes a unique, domed design of the evaporation chamber, which includes many energy-saving features not previously utilized in earlier, less efficient systems. For example, applicant's dome is designed to permit maximum collection of the distillate which has condensed on the dome's inner-wall surface. Further, the same uniquely configured structure effectively limits re-evaporation of the condensate. Applicant has also provided a means of pre-heating the "load", (e.g. the polluted source-water) prior to its entry into the evaporation chamber. Several designs are included for such preheating, depending on the geographical location and its exposure to the sun's rays. Additionally, co-generation of electricity is a further design aspect which increases the overall efficiency of the system.

OBJECTS OF THE INVENTION

An object of the invention is to provide a system for producing potable water from sea water and other types of polluted water.

Another object of the invention is to provide a system for producing potable water from pollluted water, which substantially utilizes the sun's energy.

Yet another object of the invention is to provide a system for producing potable water from polluted load-water, and also co-generate electricity for possible sale or use in the system for heating the load.

A further object of the invention is to provide a system for producing potable water from polluted load-water, wherein certain design features are utilized to vastly increase the efficiency of the system.

Yet another object of the invention is to provide a system for producing potable water from polluted load-water, which system includes several embodiments of the evaporating chamber dome for use in different geographical locations.

A still further object of the invention is to provide a system for producing potable water from polluted load-water, while recovering various contaminant by-products from that load, such as fertilizer, chemicals, oil products and other polluting contaminants.

Another object of the invention is to provide a system for producing potable water from polluted load-water, and recycling various by-products wherein the system utilizes gravity for moving the water and driving turbines for producing electricity, further conserving energy.

These and other objects of the instant invention will become more apparent hereinafter. The instant invention will now be described with particular reference to the accompanying drawings which form a part of this specification wherein like reference characters designate the corresponding parts in the several views.

BRIEF DESCRIPTION OF THE DRAWINGS

FIG. 6 is an elevational view of the load evaporation tank and its associated mechanism for raising the frame and net with both in the lowered position in the load evaporation tank.

FIG. 7 is an elevational view of the load evaporation tank with the frame and net in their raised position in preparation for replacing the net.

FIG. 8 is a plan view inside the evaporation chamber showing the net and frame in their lowered position and also the float mechanism for controlling the level of the load in the load evaporation tank.

DETAILED DESCRIPTION OF THE DRAWINGS

Figure 1A:
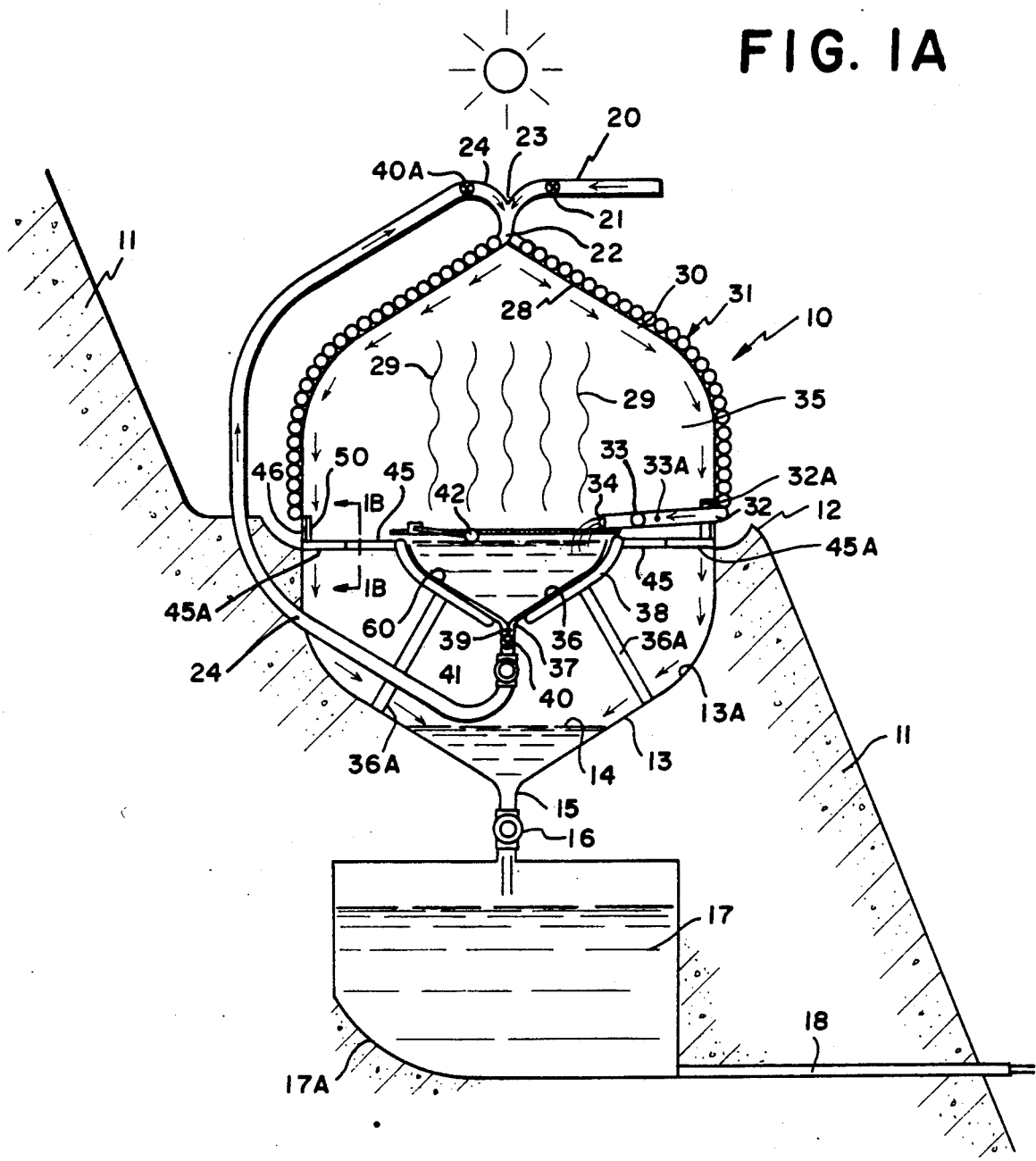
FIG. 1 is an overall side elevational view of the evaporating apparatus with the side opened to illustrate the interior thereof.
FIG. 1B is a sectional view taken along the plane 1B—1B of FIG. 1A illustrating the tear-drop configuration of the door frame.
FIG. 1C is an illustration of the tear-drop configuration of the load supply pipe, upon entry into the apparatus.

Referring now to FIG. 1 there is shown the water purification apparatus generally indicated by the numeral 10. As illustrated, water purification apparatus 10 is positioned at an elevated location wherein the elevated ground 11 has been levelled as at 12 to provide an area for erecting the apparatus 10. Apparatus 10 comprises an upper portion or dome 30 which constitutes that portion above the ground level 12 and a lower portion 13 which is positioned below the surface of the ground 12. Dome 30 is configured such that any condensate droplets which collect upon its interior surface 28 will follow the smooth interior surface 28 and collect in collecting tank 13. It is to be noted that the condensate droplets will slide down interior surface 28 rather than drop from the interior surface 28 back into load tank 36. This unique design contributes significantly to the system efficiency. Lower portion 13 serves as the condensate collecting tank 13 with the level of the collected condensate illustrated at 14.

As is also shown, condensate collecting tank 13 is provided with a smooth internal surface 13A which converges toward outlet 15. Positioned immediately below outlet 15 is turbine 16 (schematically illustrated) which is operatively connected to a generator (not shown) for co-generating electricity by utilizing the gravitational energy of the condensate in tank 13 as it is transferred to the clean water storage tank 17. Water storage tank 17 includes a curved wall portion 17A which serves to facilitate the discharge of purified water from tank 17. As envisaged the subject apparatus 10 would be located in an elevated position and by the utilization of the above mentioned turbine/generators 16 a significant amount of energy would be captured thus adding to the overall system efficiency. In situations where the load is readily available at an elevated location, i.e. a community located on an elevated location, it would be desirable to locate possibly a pair of turbine/generators 16 at spaced intervals of possibly several hundred feet below distillate outlet 15 to take advantage of the elevated location and thus permit generation of additional electricity with the pair of turbine/generators 16.

Still referring to FIG. 1A, there is shown the path of the "load" which is to be purified. The term "load" as used throughout, is intended to refer to the fluid or fluid-containing material which is to be purified and is intended to include salt water, industrial waste water, sewerage and any other type of commercial waste which contains water therein. In all instances, the load is pre-screened for solids prior to entry into the system. As shown, the load enters via conduit 20 that is controlled by valve 21 in response to level sensor 22. Conduit 20 is one leg of a Y-connection 23 with re-cycle conduit 24 forming the left-hand leg which is controlled by valve 40A. Both conduits 24 and 20 merge into a single outlet which develops into a continuous conduit with increasing diameter circles as the conduit comes down the outer surface of the dome 30 of evaporation chamber 35. This continuous circular path on the exterior of dome 30 forms the preheater 31 of the load, thus adding heat thereto as the load gravitates down the circumferential path which terminates in conduit 32 with a variable flow control valve 33 near its terminal end 34 and discharges the load into load tank 36. It is to be noted that load tank 36 is somewhat conical with a smooth curved outer surface and terminates in a discharge port 37. The curved outer surface of load tank 36 is provided with a plurality of heater elements 38 which run longitudinally along the exterior surface of load tank 36 and cover the complete outer surface for a full 360 degrees. Discharge port 37 is provided with a thermostat 39 for controlling valve 40 which controls the flow of load prior to entering pump 41 which forces the load back up to the left leg 24 of Y-connection 23 where it re-enters preheater 31. The re-cycled load again flows down the circular path of pre-heater 31 as before indicated. The internal walls of the preheater conduits are preferably coated with TEFLON to reduce corrosion or contaminant build-up on the inner walls. The size or internal diameter of the preheater conduit will vary depending on the particular installation and the type of load it is handling.

Further, FIG. 1A illustrates the circular walkway 45 which completely surrounds load tank 36 to provide access to workmen for performing necessary duties such as replacing filter net 50 and removing the sludge/residue which has collected therein. Since walkway 45 does not extend to the inner wall of load tank 13, a pair of gangplanks 45A, located diametrically opposite to each other, are used to provide access to and from walkway 45 and door 46. Filter net 50 is not clearly shown in this view however, it will be discussed later in greater detail with respect to other figures. Float mechanism 42 is shown as being in contact with upper surface of the load in load tank 36. Lower condensate collecting tank 13 is a mirror image of dome 30 in configuration with its lowermost end terminating in condensate tank outlet 15 feeding turbine/generator 16 and then into clean water storage tank 17. Further, a plurality of support or bracing members 36A are shown as extending diagonally downward from the outer surface of load tank 36 and terminate in abutment with the inner surface of condensate tank 13. Bracing members 36A, only two of which are illustrated, are provided in sufficient number to provide support for load tank 36, walkway 45 and any additional equipment positioned thereon.

With respect to preheater 31 it should be noted that metal pipes, preferably of copper or other heat conductive material, are used. The exterior surface of the pipes is coated with black paint to serve as a "black body" for heat conducting purposes and is further coated with an infra-red absorbent polymer. As illustrated, the pipes are tightly coiled flush against the outer surface of dome 30.

It appears that a review of the operation of the apparatus would be helpful at this point. Therefore, starting at conduit 20 fresh load enters the system and passes by gravity down through the many passes of circular loops constituting preheater 31, around the exterior of dome 30 where the load absorbs solar and environmental heat, and its temperature is raised significantly. After passing through preheater 31 the load is discharged via conduit 32 into load tank 36, which is within the enclosure of dome 30 where additional heating takes place if needed. As the temperature of the load increases, it begins to vaporize and, as indicated, vapors 29 will rise and condense on the internal surface 28 of dome 30. As illustrated, internal surface 28 of dome 30 is smooth, thus allowing the condensation to flow unimpeded down the internal surface 28 and collect in the condensate collecting tank 13.

With respect to the operation of apparatus 10 there are three different modes of operation. Firstly, there is the recycling mode, which is used when solar heating is available. In this mode, valve 40 and valve 40A are open in response to thermostat 39 which indicated that the temperature in load tank 36 has fallen below a predetermined level. In this mode, valve 21 is closed, thus preventing fresh load from entering Y-connection 23. Pump 41 has been energized to take suction from the bottom of load tank 36 and pump it via conduit 24 back up to the top of dome 30 and enter Y-connection 23 where it will fall by gravity down through pre-heater 31. Recycling mode is overridden completely be master thermostat 33A in the following manner: When exterior conditions are insufficient to efficiently pre-heat either fresh or recycled load, the temperature of load-water in load conduit 32 will fall. Master thermostat 33A will respond when that fall reaches a critical point, by deactivating thermostat 39, closing valves 40 and 40A, de-energizing pump 41, and energizing electric heaters 38. Until master thermostat 33A registers a temperature rise beyond the above critical point, the entire system's heating is derived from heaters 38. As these heaters 38 heat the load and evaporate it, the water level in load tank 36 drops. This drop is registered by float valve 42 triggering valve 33 to release additional load into load tank 36. When master thermostat 33A senses sufficient increase in load-water temperature, recycling mode is re-initiated, and electric heaters 38 are deactivated.

The second mode of operation, or topping-off mode, is used only when the first mode, described above, is inactive. This may occur upon master thermostat 33A override or if load tank 36 temperature remains above the pre-detemined level. In topping-off mode, valve 21 is opened when water-level sensor 22 senses a low water level condition in pre-heater 31. Conversely, if water-level sensor 22 senses a high water level in pre-heater 31 it will send a signal to close valve 21.

The third mode of operation is referred to as the load tank level mode. This mode is always energized and operates with both the first or second mode. In this mode, float valve 42 which rides on the upper surface of the load in load tank 36 will sense the level of the load therein. When float 42 is in its high position, which indicated that load tank 36 is filled, a signal is sent to valve 33, (which is a variable flow valve) to close it. However, when float 42 has dropped to its lower position, a signal is sent to valve 33 to open it, thus adding additional load to load tank 36.

It is to be noted that electric heaters 38 are only energized at night or on days when there is insufficient solar or ambient heat to provide energy to the pre-heating system.

Figure 1B:
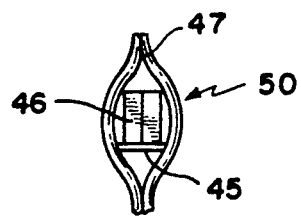

Referring now to FIG. 1B, there is shown a view taken along 1B—1B of FIG. 1A wherein door 46 is illustrated as positioned within a tear-drop shaped door frame 47, extending in awning fashion over the door 46. The purpose of the tear-drop shaped door frame 47 is to permit uninterrupted flow of condensate down the internal surface 28 of dome 30. Another such door 46 and door frame 47 are located diametrically opposite thereof, both such doors permitting ingress and egress from the interior of dome 30. Other appropriate-sized similarly framed doors may be added to permit removal of filter net 50 and any residue therein.

Figure 1C:
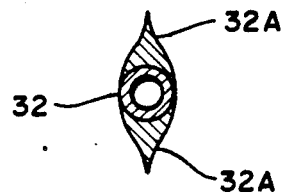

FIG. 1C is a sectional view through conduit 32 of FIG. 1A, although the plane of the section is not illustrated in FIG. 1A due to space limitations. As shown, conduit 32 is provided with upper and lower fairings 32A to present a tear-drop shape thus providing smooth flow lines for the condensate as it flows toward condensate collecting tank 13. All additional conduits, power lines or the like, which have to penetrate the wall of dome 30 and condensate collecting tank 13 are treated in similar fashion to permit condensate flow as smoothly as possible into condensate collecting tank 13.

Figure 2:
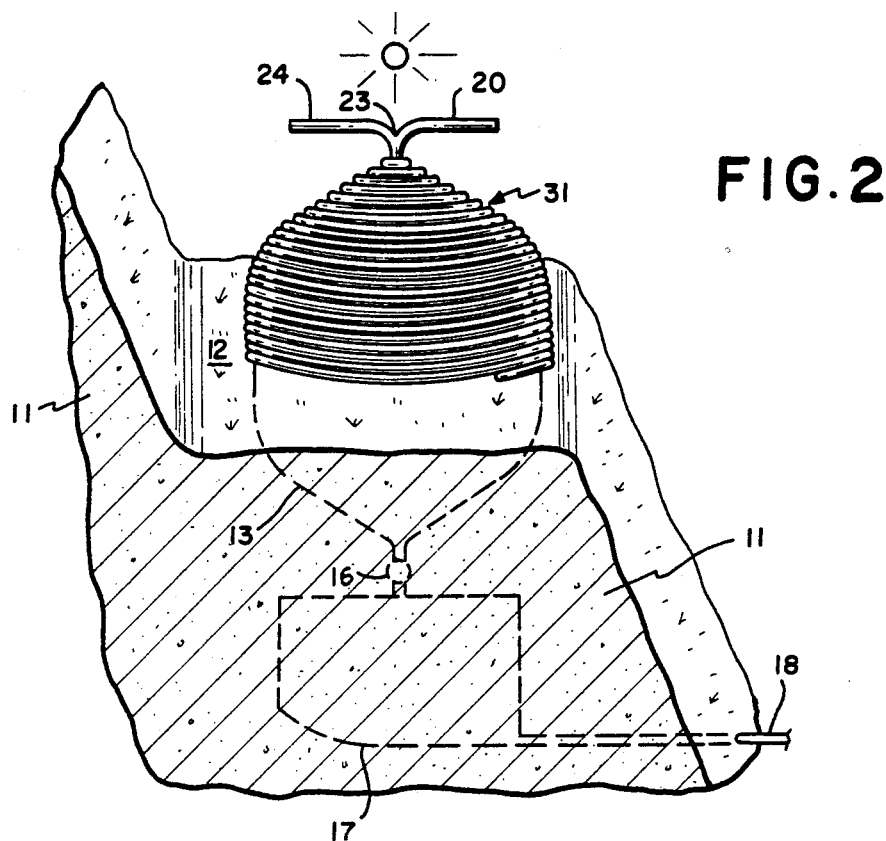
FIG. 2 is a side elevational view of a first embodiment of the apparatus constructed at an elevated location.

Referring now to FIG. 2, there is shown a side elevational view similar to the structure illustrated in FIG. 1A. However, FIG. 2 is a view of the exterior of dome 30 with the preheater 31 formed as a continuous plurality of circular wraps about the exterior surface of dome 30 increasing progressively in diameter until it reaches the maximum diameter and continues downwardly to ground level 12 where the conduit passes through dome 30 and terminates at 34 in FIG. 1A. As shown, the slopes above and below levelled sufrace 12 are merely for illustration purposes. Such slopes could be of lesser angles without any effect on the system's efficiency.

It is to be noted that the illustration of FIGS. 1A and 2 are examples of the installation where the sun is capable of reaching both the front and rear of the apparatus 10 during a twenty-four hour period.

Figure 3:
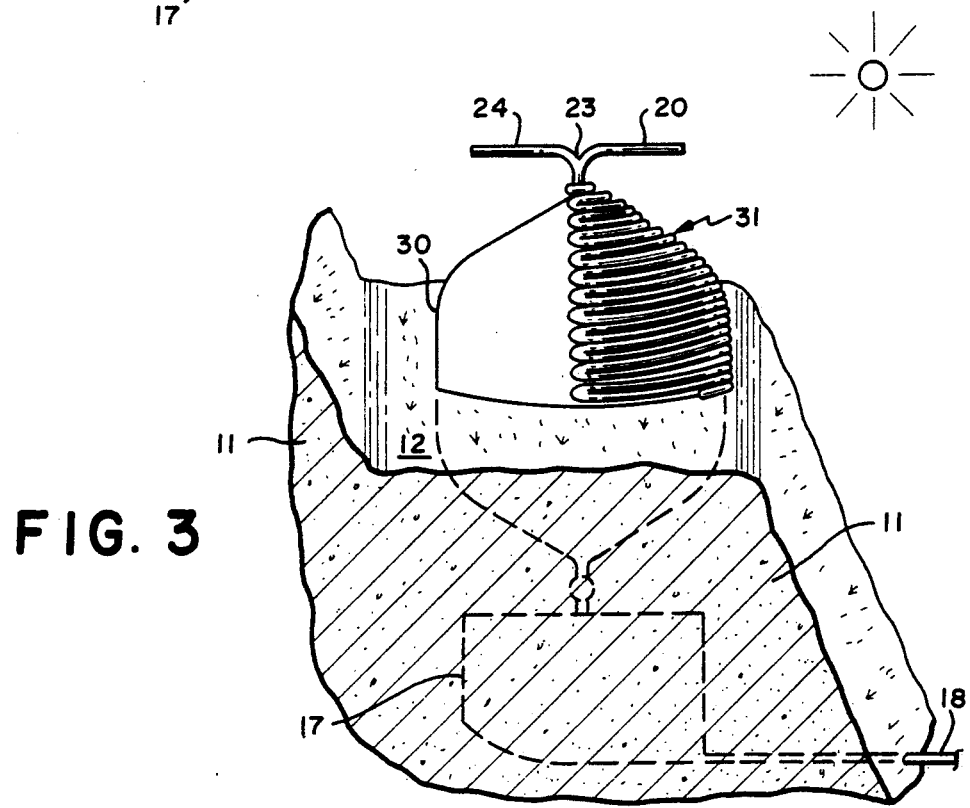
FIG. 3 is a side elevational view of a second embodiment of the apparatus constructed at an elevated location.

Referring now to FIG. 3, there is shown another embodiment of water purification apparatus 10. In this particular embodiment, preheater 31 wraps around dome 30 for only 180 degrees of surface i.e. the side facing the sun. Otherwise the remaining components are the same as that described supra relative to FIGS. 1A and 2. It is to be noted that the area of dome 30 not covered by pre-heater 31 does not receive black body treatment. This example of installation is for regions receiving the sun's rays primarily at an angle.

Figure 4:
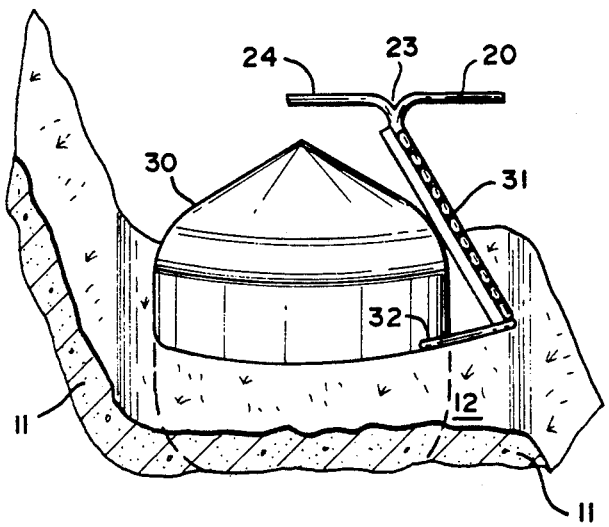
FIG. 4 is a side elevational view of a third embodiment of the apparatus constructed at an elevated location.

Referring now to FIG. 4, there is illustrated a third embodiment of pre-heater 31. In this embodiment, preheater 31 takes the form of a lean-to pre-heater. Again, the remaining components of the apparatus 10 are the same as that described relative to FIGS. 1A and 2. This embodiment would be useful inasmuch as it allows creation of an embodiment similar to that in FIG. 3, but using materials readily available on the market; e.g. passive solar heating panels/radiation collectors. This makes the system easier to set up in emergencies, or for the do-it-yourselfer.

Figure 4A:
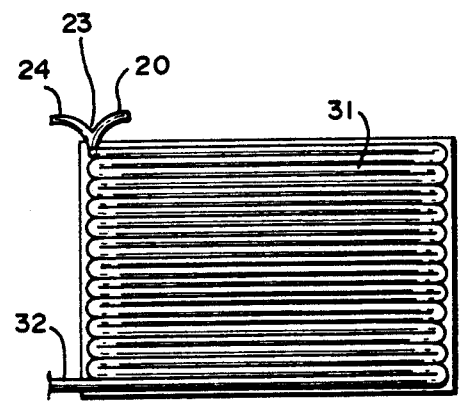
FIG. 4A is a front elevational view of the solar collector per se as utilized in the embodiment of FIG. 4.

FIG. 4A is a front elevational view of preheater 31 as used in the embodiment of FIG. 4. As illustrated, load enters conduit 20 and then passes into preheater 31. As the load flows through preheater 31 it picks up the sun's heat and has its temperature raised significantly prior to discharging into load tank 36.

Figure 5:
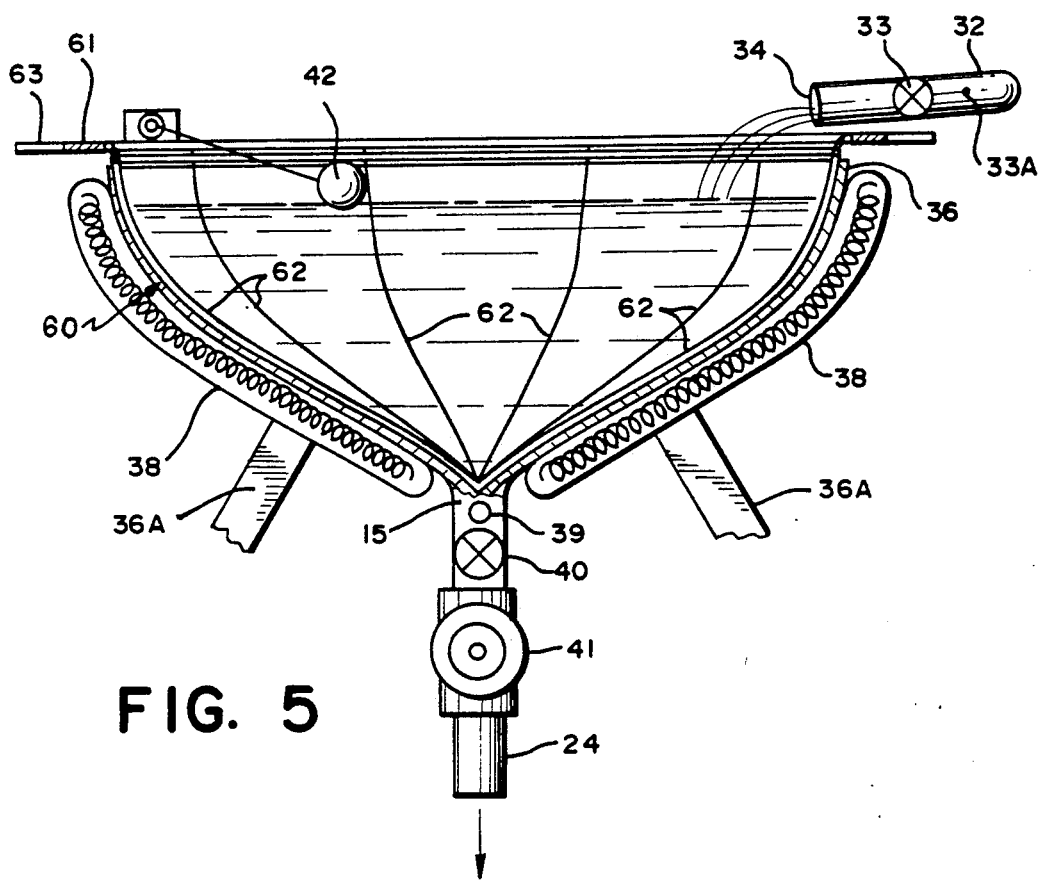
FIG. 5 is an elevational view of the load evaporation tank utilized in each of FIGS. 1A, 2, 3, and 4.

Referring now to FIG. 5, there is shown an elevational view of the load tank 36 and the associated electrical heater elements 38 which completely surround the outer surface of load tank 36. As illustrated, load tank 36 has been removed from within apparatus 10 to provide a clearer picture of its components. Load tank 36 is illustrated in cross-hatching with one half of its circumference removed to give an illustration of the interrelated components.

Referring to FIG. 6, there is shown an illustration of the loak tank 36 in cut-away fashion partially illustrating the mylar filter net 50 in position with forming spokes 62 of frame 60 holding filter net 50 in its extended position relative to load tank 36. Filter net 50 is shown partially to reduce the detail required in this figure since filter net 50 is fully illustrated in FIG. 8. Additionally, there is shown a pair of extension arms 63 which extend radially outwardly from frame rim 61. Arms 63 are positioned 180 degrees apart and serve to provide the operative connection with rack gear 64 which is engaged by pinion 65 and driven by motor 66 which is operatively mounted below walkway 45. As illustrated in FIG. 6, both frame 60 and filter net 50 are in their lowermost position and properly placed in load tank 36. As shown, frame rim 61 supports a plurality of spaced spokes 62 which prevent net filter 50 from rising when inserted into load tank 36. Filter net 50 is provided with a net rim 51 which is releaseably attached to frame rim 61. The specifics of the attachment means will be discussed relative to FIG. 10. As one can imagine, when apparatus 10 is used for processing loads such as salty or otherwise polluted water there, is a considerable possibility that residues, contaminants, or the like in particle form may precipitate from the load as the water evaporates. Therefore, filter net 50, which is formed of a fine mesh material, will serve to filter the load in load tank 36 before it can leave to be recycled through preheater 31. When the build-up of residue reaches an appropriate level, filter net 50 has to be removed from load tank 36 and replaced with a fresh, clean filter net 50. After removal, the old filter net 50 is moved to an appropriate location external of apparatus 10 and depending upon the type of load residue may be stored for recycling processing to recuperate the raw materials contained in that residue.

FIG. 7 is an illustration similar to that of FIG. 6, however, in this view frame 60 and filter net 50 have been elevated sufficiently to permit filter net 50 to be replaced. The releasing procedure of filter net 50 from frame 60 will be described later with respect to FIG. 10. Additional supporting equipment may be used which is not shown nor considered part of the instant invention, such as winches, cranes and the like.

FIG. 8 is a plan view illustrating walkway 45 which completely surrounds frame 61 and filter net 50. Motor 66 and pinion 65 are shown in dotted lines since they are mounted beneath walkway 45. Additionally, a pair of gangplanks 45A extend from walkway 45 to door frames 47. Filter net 50 is only partially shown, however, it is to be understood that it completely fills the area within frame rim 61. Also float 42 is illustrated in a second position by dotted lines. In this second position, frame 61 and filter net 50 can be raised from load tank 36.

Figure 9:
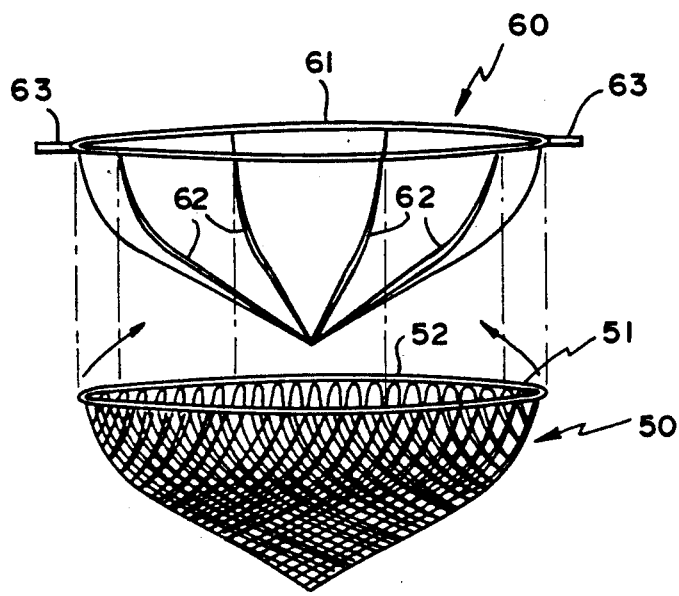
FIG. 9 is an elevational view of the supporting frame and the MYLAR filter net per se.

Turning now to FIG. 9, there is shown frame 60 and forming spokes 62 which provide shape to filter net 50 when inserted into load tank 36. Frame rim 61 and spokes 62 are integrally formed as a unitary member 60 as by molding. Also shown is filter net 50 after it has been released from frame 60. Filter net rim 51 is hinged at 52 to permit filter net rim 51 to rotated upwardly as indicated by the arrows to permit easy closure and removal of filter net 50 and any residue therein from apparatus 10.

Figure 10:
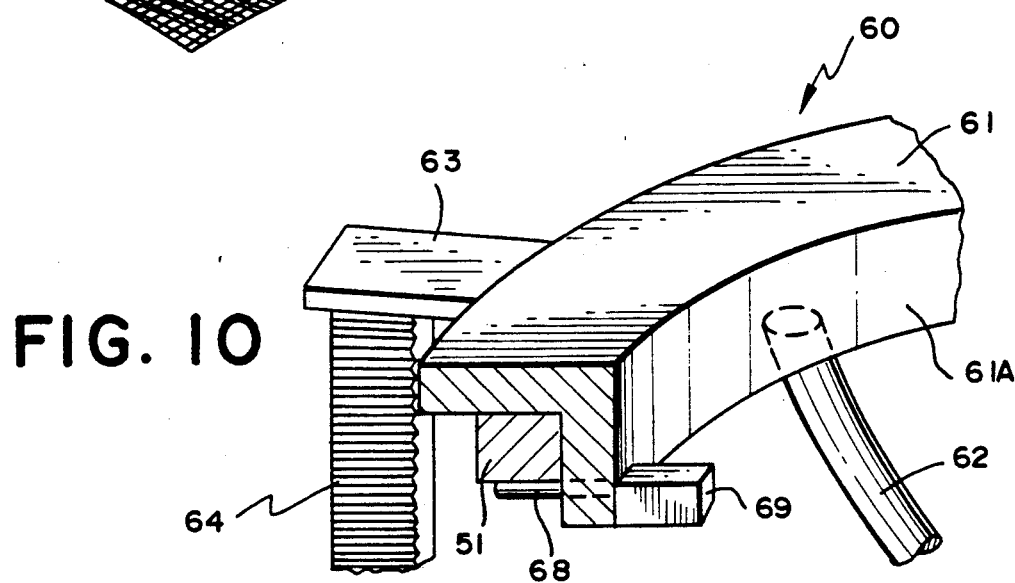
FIG. 10 is a partial illustration of the supporting frame and the net rim illustrating how the two components are releaseably secured to each other.

Referring now to FIG. 10, there is shown an enlarged detail view of the area enclosed within circle A of FIG. 7. As shown, frame rim 61 is an inverted L-shaped in cross-section and receives filter net rim 51 within the angle portion thereof. A plurality of latch members 68 which are solenoid operated are positioned around the inner circumference 61A of frame rim 61 and provided with solenoids 69. Energizing solenoids 69 simultaneously retracts all latch members 68 until latch members 68 are withdrawn from beneath filter net rim 51, permitting filter net rim 51 and the attached filter net 50 to be released from frame rim 61 allowing it to be removed and replaced with a clean, empty filter net 50. FIG. 10 also shows frame rim 61 and forming spokes 62 as a single piece, molded from a high strength carbon fiber which permits it to retain its shape.

Additionally, FIG. 10 illustrates the manner in which forming spokes 62 are secured to frame rim 61 and also the manner in which net rim 51 is attached to frame rim 61. As illustrated, spokes 62 are molded to frame rim 61 to provide shape for filter net 50. Thus, forming spokes 62 are securely anchored to frame rim 61. Further, rack gear 64 is partially shown with its uppermost end securely attached to rim extension 63 as by welding or other appropriate means.

Figure 11:
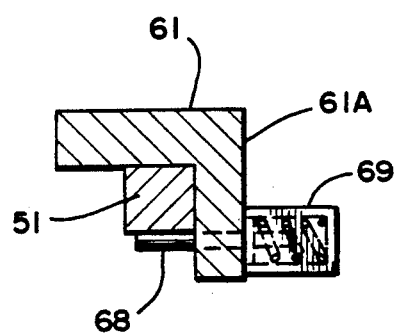
FIG. 11 is an enlarged illustration of the attachment means for securing the net rim to the frame rim.

FIG. 11 is a detail view of the latching mechanism which holds net rim 51 in place relative to frame rim 61. Solenoid 69 is utilized to extend latching member 68 into position beneath net rim 51. Although only one such latching mechanism is illustrated, it is to be understood that a plurality of such solenoids 69 and latching members 68 are appropriately positioned around the circumference 61A of frame rim 61. Appropriate electrical circuitry (not shown) provides power to solenoids 69 and, when it is desired to replace filter net 50 and it has been raised out of load tank 36, merely by energizing solenoids 69 all latching members 68 are simultaneously withdrawn from beneath net rim 51 permitting filter net 50 to be lowered therefrom. Solenoids 69 are each provided with spring means for extending latching members 68 after a clean filter net 50 and rim 51 are properly positioned relative to frame rim 61.

While the invention has been described in its preferred embodiment, it is to be understood that the words which have been used are words of description rather than limitation and that changes may be made within the purview of the appended claims without departing from the full scope of the invention. Such a change can include use of the system without the use of preheater 31.

Having thus described my invention, I claim:

1. A solar water purification system comprising enclosure means having a domed structure and a distillate collecting means positioned below said domed structure; load tank means operably positioned in said distillate collecting means; load supply and preheater means for delivering load to said load tank means; said load tank means including a load tank having an open uppermost circular portion and an outlet at its lowermost portion; recycling means for removing cooler load from said load tank means via said outlet and redirecting said cooler load back to said preheater means whereby additional heat is added to said load prior to its return to said load tank means where it evaporates and purified vapors collect on the internal surface of said domed structure and smoothly flow by gravity down said internal surface into said distillate collecting means.

2. A solar water purification system of the character defined in claim 1 wherein said domed structure and said distillate collecting means are mirror images of each other with said distillate collecting means including a distillate collecting tank which is inverted downwardly, said domed structure having an apex with smooth diverging surfaces which extend to an arcuate portion and then terminates in a cylindrical vertical surface which smoothly joins the cylindrical vertical surface of said distillate collecting means, followed by a corresponding arcuate portion which connects with a smooth converging surface that terminates in an outlet which is in vertical alignment with said apex whereby vapors which collect on the inner surface of said domed structure will follow the contour of said domed structure inner surface and collect in said distillate collecting tank without falling back into said load tank.

3. A solar water purification system of the character defined in claim 1 wherein said load is seawater.

4. A solar water purification system of the character defined in claim 1 wherein said load is any form of contaminated water.

5. A solar water purification system of the character defined in claim 2 wherein said load tank means comprises a tank having a circular upperwall which gradually converges downwardly to a centrally located outlet; a plurality of diagonal support members engaging said tank at one end and securely attached to the inner surface of said distillate collecting means at their other ends and electrical heater means positioned on the outer surface of said load tank means to serve as a back-up heating source.

6. A solar water purification system of the character defined in claim 5 wherein said load tank means further includes a circular walkway which concentrically surrounds said load tank periphery and terminates a predetermined distance from said circular vertical inner surface of said distillate collecting means providing access to workmen thereabout, said load tank means further including a pair of oppositely positioned gangplanks extending radially from the outer periphery of said walkway to the inner wall of said distillate collecting tank permitting ingress and egress via door means which extends through said inner wall of said distillate collecting tank.

7. A solar water purification system of the character defined in claim 6 wherein said door means includes a pair of diametrically disposed doors each of which is provided with tear-drop shaped canopy means which allow downwardly flowing condensate to smoothly and unimpededly flow into said distillate collecting tank around said door means.

8. A solar water purification system of the character defined in claim 1 wherein said load supply and preheater means comprises an input conduit which discharges into one leg of a Y-connection and subsequently flows serially into a plurality of increasing diameter conduit circles which are tightly wrapped about the exterior surface of said domed structure; said load absorbing solar heat as it travels down said preheater means and terminates in a discharge conduit which extends through said domed structure and discharges into said load tank means; said load supply and preheater means including valving and thermostat means.

9. A solar water purification system of the character defined in claim 8 wherein said preheater conduits are made of copper or other heat conductive material which is coated with with black paint to serve as a black body for heat conducting purposes and further coated with an infra-red absorbent polymer to further improve its heat conducting properties.

10. A solar water purification system of the character defined in claim 8 wherein said recycling means includes appropriate valving and controls connected to said outlet of said load tank and additional conduit means extending from said outlet to the other leg of said Y-connection upstream of said preheater means.

11. A solar water purification system of the character defined in claim 1 wherein said preheater means comprises a serially arranged load conduit positioned to face the sun and begins at the top of said domed structure and continues in serpentine fashion back and forth across one-half of the domed structure with said one-half being that portion of said domed structure which is exposed to the sun's rays.

12. A solar water purification system of the character defined in claim 1 wherein said preheater means comprises a planar surface of sinuous conduit which is positioned in a lean-to fashion against a portion of said domed structure.

13. A solar water purification system of the character defined in claim 1 wherein said load tank means includes a preformed frame that includes a frame rim and a plurality of spokes contoured to the internal shape of said load tank, mesh-like filter means and attachment means; said filter means having a rim portion and is positioned below said plurality of spokes whereby said mesh-like filter means is stretched into conformity with the contour of said load tank.

14. A solar water purification system of the character defined in claim 13 wherein said attachment means comprises a plurality of spaced electrical solenoids with latching pins whereby when said solenoids are energized said latching pins extend below the rim of said filter means and hold it in close contact with said preformed frame rim and provide support thereto.

15. A solar water purification system of the character defined in claim 13 wherein said preformed frame means further includes a pair of opposed rim extensions which cooperate with gearing and motor means whereby said preformed frame means and said mesh-like filter means can be raised from said load tank means for cleaning or replacement purposes.

16. A solar water purification system comprising enclosure means having a domed upper structure means and a lower distillate collecting means positioned below said domed upper structure means; a load tank operably positioned in said distillate collecting means; load supply means for delivering said load to said load tank means; heater means for heating said load to the point of vaporization, recyling means for removing cooler load from the bottom of said load tank and redirecting said cooler load back to said heater means to add additional heat thereto; turbo-generator means operably connected to said distillate collecting means and driven by the distillate produced in the evaporation of said load.

17. A solar water purification system of the character defined in claim 16 wherein said domed upper structure means comprises a dome having an apex, a smooth first portion diverging in all directions for a pre-determined distance, a second arcuate portion smoothly connected to said first portion, and a third portion formed by a cylindrical vertical wall surface smoothly connected to the lower end of said second arcuate portion, said three mentioned portions forming the internal surface of said domed structure means and cooperate to permit a smooth, uninterrupted gravitational flow of condensate which collects in the uppermost portion of said dome structure means into said distillate collecting means.

18. A solar purification system of the character defined in claim 16 wherein said heater means includes a solar preheater which is mounted externally of said domed upper structure means.

19. A solar purification system of the character defined in claim 18 wherein said solar preheater comprises a conduit of increasing diameter circular passes around the exterior surface of said domed upper structure until a maximum diameter is reached followed by a plurality of constant diameter convolutions around said domed upper structure and discharges into said load tank; said conduit having a coating of black paint to serve as a black body for heat absorbing purposes and then coated with an infra-red absorbing polymer to further increase the temperature of the load whereby the load temperature is elevated sufficiently to bring about evaporation of the water contained in said load.

20. A solar purification system of the character defined in claim 16 wherein said heater means includes a plurality of electrical heating elements which are positioned in close contact with the outer surface of said load tank whereby said electrical heating elements can provide heat on days when solar heat is not available to permit a continuous supply of purified water.

21. A solar purification system of the character defined in claim 16 wherein said domed upper structure means and said lower distillate collecting means are mirror images of each other.

* * * * *